Dec. 16, 1969   J. MARTIN   3,484,227
DRAWING AND/OR ANNEALING ROLLS FOR SHEET GLASS MAKING APPARATUS
Filed May 13, 1965
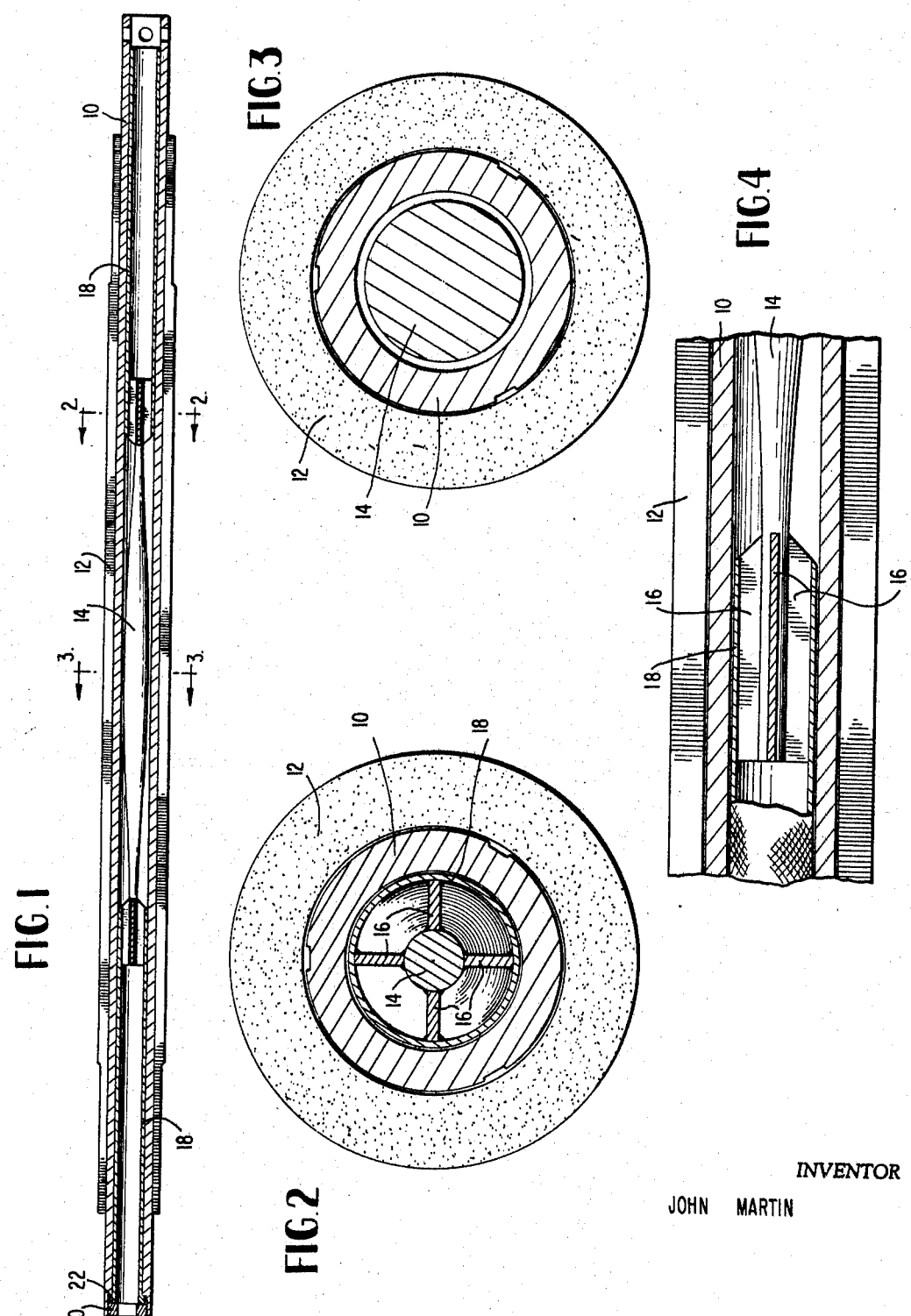
INVENTOR
JOHN MARTIN

United States Patent Office 3,484,227
Patented Dec. 16, 1969

3,484,227
DRAWING AND/OR ANNEALING ROLLS FOR
SHEET GLASS MAKING APPARATUS
John Martin, Monterrey, Nuevo Leon, Mexico, assignor
to Fabricacion de Maquinas, Monterrey, Nuevo Leon,
Mexico, a corporation of Mexico
Filed May 13, 1965, Ser. No. 455,433
Int. Cl. C03b 25/04
U.S. Cl. 65—356                                 1 Claim

ABSTRACT OF THE DISCLOSURE

A forming or annealing roll for a sheet glass making machine is disclosed which is hollow to provide for circulation of a coolant therein. In ordr eto insure a uniform temperature of the glass sheet contacted by the roll, the roll is non-uniformly cooled along its length by providing a coolant deflector structure within the roll which is a surface of revolution having its largest diameter at the center of the roll and decreasing on either side of center to a minimum at opposite ends of the roll.

The present invention relates to rolls for glass making machines and more particularly to cooling structures for drawing and/or annealing rolls for glass making machines of the sheet glass making type.

Rolls of the type to which the present invention is addressed are of the order of ten feet in length and weigh up to seven or eight hundred pounds each. In use, these rolls are subjected to extreme temperature conditions. Those in a vertical sheet glass forming machine for example and particularly those located in the lower portions of such machines operate at extremely high temperatures. Due to the structure of the rolls and the physical size of the rolls, there is a very definite problem in achieving a uniform temperature of the glass sheet as it moves between adjacent roll pairs. Substantially all of the prior art relating to rolls of this type deals with the problem of attempting to maintain a uniform temperature of the roll itself throughout its longitudinal extent. The reason given for attempting to maintain such a constant and uniform temperature is to prevent distortion of the roll itself due to the temperature conditions. Applicant has found however that a superior glass is produced not by having a uniform roll temperature but by having a uniform temperature of the glass sheet from edge to edge thereof.

As is well known to those skilled in this art, the end portions of glassmaking machine rolls are supported in relatively heavy bearing structures. This means that there is a relatively large mass of metal surrounding the end portions of these rolls whereas this is not true of the center portions. The result is that if nothing else is done, the roll will operate at higher temperatures at its center than at its ends because of the higher heat loss due to radiation through the larger masses of metal positioned adjacent to the ends of the roll. The portions of the glass sheet being drawn and/or annealed which lie adjacent the outer ends of the rolls will be somewhat cooler than the center portions of the sheet for the same reason. It has been further found that attempts to cool the roller interiorly by liquid or fluid have been less than entirely successful in achieving either the uniform roll temperature or uniform glass temperature.

Accordingly, it is the principal object of the present invention to provide an internally cooled roll structure which is effective to provide for a more nearly uniform temperature of the glass sheet from edge to edge during the drawing and/or annealing process.

Other advantages of this invention will be apparent to those skilled in this art from the following detailed description taken in conjunction with the attached sheet of drawings in which FIGURE 1 is a side view partially in section of a roll in accordance with the present invention.

FIGURE 2 is a section on the lines 2—2 of FIGURE 1.

FIGURE 3 is a section on the lines 3—3 of FIGURE 1 and

FIGURE 4 is an enlarged view of a portion of FIGURE 1.

In general, the objects of the present invention are achieved by providing an internal structure for a hollow glass making roll which structure is effective to produce an increase in the velocity of the coolant at the center portions of the roll and to decrease the velocity of the coolant on opposite sides of the center of the roll to points substantially equidistant from the ends of the roll. In effect, a deflector member is positioned within the hollow roll which is so shaped that it defines, together with the interior of the roll, an annular interval which interval increases in opposite directions longitudinally of the center of the roll. Since the coolant increases in temperature as it progresses longitudinally of the roll, the annular interval downstream of the center of the roll may increase at a lesser rate than on the upstream side of the roll center in order to achieve uniform temperature of the glass sheet.

Referring now to FIGURE 1 of the drawings, the roll is shown as including an elongated hollow cylindrical metallic core member 10 which carries on its outer surface a glass contacting surface usually asbestos. Positioned within the hollow core member 10 is a deflector member 14 which may be either solid or hollow and may be metallic or ceramic. In either event, it will be noted that the member 14 has an outer surface which is the surface of revolution having its greatest diameter located at the longitudinal center of the core 10. From this center point, the diameter of the member 14 decreases in both directions. By positioning the member 14 within the core 10 there is thus defined an annular interval between the interior surface of the core and the exterior surface of the member 14 and this annular interval has its smallest area at the longitudinal center of the core 10. This annular interval increases in area in both directions on either side of the longitudinal center of the core and the rate of increase on opposite sides of the roll center may vary in order to obtain the desired rate of cooling at all points along the roll to maintain uniform the temperature of the glass sheet.

Assuming therefore that a flow of fluid coolant is established through the center of the core, the velocity of the flow of such coolant from one end of the core will increase up to the longitudinal center of the core and then decrease as it progresses toward the opposite end of the core.

Since the rates of heat exchange is directly dependent upon the velocity of travel of the coolant past the surface to be cooled, it will be obvious that a relatively higher rate of heat transfer between the roll and the coolant will be effected at the longitudinal center portions of the core and further that such rate of heat transfer will diminish on opposite sides of the longitudinal center of the core.

By adjusting the length and the degree of taper of the member 14, it will be possible to achieve any desired ratio of heat transfer along the length of a given roll.

Mounting of the deflector member 14 in the interior of the roll could be effected in any number of ways but as illustrated in FIGURES 1, 2 and 4, a preferred structure for mounting is effective to further reduce the rate of heat transfer between the roll and the coolant adjacent opposite ends of the roll. As shown most clearly in FIG- URES 2 and 4, opposite ends of the deflector 14 are provided with four radially extending fins 16 which are attached by any convenient means such as tack welding to the interior surfaces of hollow sleeves 18. (The mounting structure of the deflector 14 in the sleeves 18 is identical at opposite ends of the deflector.) The sleeve 18 may be formed of any desired material but since it serves a double purpose, that is of mounting the deflector 14 in the interior of the core and of reducing the rate of heat transfer between the fluid coolant and the core at the ends of the roll, it is desirable that sleeve 18 have something less than a snug fit in the core to decrease the rate of heat transfer between the sleeve and the interior of the core 10. One suggested arrangement which has been found to be effective in this regard is to machine both right and left hand threads on the outer surfaces of the tubes or sleeves 18. The outside diameter of such threads is such that when the deflector assembly including sleeves 18 is inserted into the interior of the roll the crests of the threads snugly engage the interior of the roll surface. This will leave a small layer of air between the sleeves 18 and the interior of the core 10 which acts as an insulating layer and reduces the amount of heat transfer between the fluid coolant and the roll core 10 in these areas.

As indicated in FIGURE 1, the entire deflector assembly including the deflector 14 and the two sleeves 18 is inserted into the interior of the hollow core 10 and may be releasably held in place by means of a nut 20 threadably engaging a counter bore in the left hand end of the core 10 and abutting against the outer end of the left hand sleeve 18. Also, the left hand end of the sleeve 18 may have an enlarged portion or flange 22 which abuts against the shoulder of the counter bore in the member 10 to fix the longitudinal position of the entire assembly within the core.

I claim:
1. An internally fluid cooled drawing and/or annealing roll for sheet glass making machines comprising:
   (1) an elongated hollow cylindrical metallic core;
   (2) a glass contacting surface surrounding and supported on said core;
   (3) a deflector member centrally mounted within said core and having an outer surface of revolution which together with the interior surface of said core defines an annular interval which is narrowest at the center of the roll and increases longitudinally of the roll on opposite sides of the roll center to a maximum at points spaced substantially equally inwardly from opposite ends of the working surface of the roll; and
   (4) a pair of sleeves, positioned at longitudinally spaced points within and engaging the interior of said core, extending from adjacent the ends of said core to points substantially equidistant from the ends of said core for reducing the rate of heat transfer between an internally circulated fluid coolant and the end portions of said core, said sleeves supporting said deflector member in centrally aligned position in said core, the outer surface of said sleeves having a roughened surface which contacts the interior of said core only at a plurality of sharply defined points thus providing a blanket of air between said sleeves and said core.

References Cited
UNITED STATES PATENTS

| 1,536,832 | 5/1925 | Evans | 65—356 XR |
| 1,813,142 | 7/1931 | Boudin | 65—356 XR |
| 2,015,747 | 10/1935 | Drake | 65—356 XR |
| 2,300,528 | 11/1942 | Sherts. | |

FOREIGN PATENTS 354,105  11/1937  Italy.

FRANK W. MIGA, Primary Examiner

U.S. Cl. X.R.

65—253